United States Patent
Prat et al.

(10) Patent No.: US 9,263,173 B2
(45) Date of Patent: Feb. 16, 2016

(54) METHOD FOR PRODUCING A HIGH-VOLTAGE ELECTRICAL INSULATOR WITH A MORTAR INCLUDING A SUPERPLASTICIZER

(75) Inventors: Sandrine Prat, Mariol (FR); Jean-Marie George, Vendat (FR); Gilles Barthet, Cusset (FR)

(73) Assignee: SEDIVER SOCIETE EUROPEENNE D'ISOLATEURS EN VERRE ET COMPOSITE, Nanterre (FR)

( * ) Notice: Subject to any disclaimer, the term of this patent is extended or adjusted under 35 U.S.C. 154(b) by 80 days.

(21) Appl. No.: 14/344,540

(22) PCT Filed: Oct. 6, 2011

(86) PCT No.: PCT/FR2011/052339
§ 371 (c)(1),
(2), (4) Date: Mar. 12, 2014

(87) PCT Pub. No.: WO2013/050665
PCT Pub. Date: Apr. 11, 2013

(65) Prior Publication Data
US 2014/0338954 A1     Nov. 20, 2014

(51) Int. Cl.
*H01B 19/00* (2006.01)
*C04B 28/06* (2006.01)
(Continued)

(52) U.S. Cl.
CPC .......... *H01B 19/00* (2013.01); *C04B 28/06* (2013.01); *C04B 37/026* (2013.01);
(Continued)

(58) Field of Classification Search
CPC ........ H01B 19/00; H01B 17/56; H01B 19/04; H01B 3/14; H02G 7/05; C04B 28/06; C04B 2103/32
USPC ............................................ 174/212; 29/887
See application file for complete search history.

(56) References Cited

U.S. PATENT DOCUMENTS 4,372,907 A * 2/1983 Herold et al. ................. 264/265
5,466,289 A    11/1995 Yonezawa et al.
(Continued)

FOREIGN PATENT DOCUMENTS

CN        1362713 A      8/2002
CN      101901651 A     12/2010
(Continued)

OTHER PUBLICATIONS

European Office Action dated Dec. 19, 2014 for European Patent Application No. 11 782 454.0, 4 pages.
(Continued)

*Primary Examiner* — Dhirubhai R Patel
(74) *Attorney, Agent, or Firm* — Mechant & Gould P.C.

(57) ABSTRACT

A method of manufacturing a high-voltage electrical insulator (1), having at least one metal insulator element (4, 6) cemented to a dielectric insulator element (2) by a cement mortar (5), includes at least one of the following steps: preparing the cement mortar (5) from aluminous cement and sand that are mixed with at least water; assembling the dielectric element (2) with the metal element (4, 6), the mortar (5) being placed between the dielectric insulator element (2) and the metal element (4, 6); and vibrating the dielectric element (2) and the metal element (4, 6) as assembled together, so as to distribute the mortar (5) between the dielectric element and the metal element (2, 4, 6). In order to prepare the mortar (5), an active ingredient of the polymer superplasticizer type based on polyglycol methacrylic acid ester is added, and the vibrating is performed for a duration lying in the range 2 seconds to 20 seconds, and preferably in the range 4 seconds to 15 seconds.

13 Claims, 1 Drawing Sheet

(51) Int. Cl.
*C04B 37/02* (2006.01)
*C04B 40/00* (2006.01)
*H01B 3/14* (2006.01)
*H01B 19/04* (2006.01)
*H01B 17/56* (2006.01)
*H02G 7/05* (2006.01)
*C04B 103/32* (2006.01)
*C04B 111/92* (2006.01)

(52) U.S. Cl.
CPC ............. *C04B 40/0067* (2013.01); *H01B 3/14* (2013.01); *H01B 17/56* (2013.01); *H01B 19/04* (2013.01); *H02G 7/05* (2013.01); *C04B 2103/32* (2013.01); *C04B 2111/92* (2013.01); *C04B 2237/34* (2013.01); *C04B 2237/40* (2013.01); *Y10T 29/49227* (2015.01)

(56) References Cited

U.S. PATENT DOCUMENTS 5,973,272 A * 10/1999 Levillain et al. .............. 174/179
6,995,313 B1 * 2/2006 Barnett et al. ................ 174/5 R
2007/0228612 A1 10/2007 Durst et al.

FOREIGN PATENT DOCUMENTS

| | | |
|---|---|---|
| EP | 2 228 804 | 9/2010 |
| FR | 2 640 073 | 6/1990 |
| FR | 2 776 285 | 9/1999 |

OTHER PUBLICATIONS

International Search Report and Written Opinion from International Application No. PCT/FR2011/052339 mailed Jun. 4, 2012.

Chinese Office Action dated Jun. 20, 2014 for Chinese Patent Application No. 201180051216.5, 5 pages.

* cited by examiner

METHOD FOR PRODUCING A HIGH-VOLTAGE ELECTRICAL INSULATOR WITH A MORTAR INCLUDING A SUPERPLASTICIZER

This application is a National Stage Application of PCT/FR2011/052339, filed 6 Oct. 2011, and which application is incorporated herein by reference. To the extent appropriate, a claim of priority is made to the above disclosed application.

TECHNICAL FIELD

The invention relates to a method of manufacturing a high-voltage electrical insulator comprising at least one metal insulator element cemented to a dielectric insulator element by means of a cement mortar, in which method, at least one of the following steps is performed:

preparing said cement mortar from a dry mix comprising at least aluminous cement and sand, said dry mix being mixed with at least water;

assembling said dielectric insulator element with said metal insulator element, said cement mortar being placed between said dielectric insulator element and said metal insulator element; and vibrating said dielectric insulator element and said metal insulator element as assembled together, so as to distribute said cement mortar between said dielectric insulator element and said metal insulator element.

PRIOR ART

The invention relates to any type of line or substation electrical insulator for use at high or very high voltage, and in particular to an insulator having one or more metal elements, e.g. of the cap and pin type or of the type having end fittings, cemented to a dielectric part made of glass or of porcelain.

The invention relates particularly to insulators of the "cap and pin" type, comprising a metal cap fitted over the head of a dielectric part forming a skirt and a metal pin inserted into the bottom portion of the head of the dielectric part. Cap and pin insulators are designed to be coupled together by fitting the free end of the pin of a first insulator into the cap of an adjacent insulator in order to form a string of insulators, which string is used to support, anchor, or tension a very high voltage or high voltage electricity line.

The invention also relates to high voltage or very high voltage substation insulators, provided with metal end fittings for anchoring to the ground or for supporting switchgear and cemented to a dielectric body made of porcelain in the form of a cylindrical tubular column provided with fins or "sheds".

Such insulators can be subjected outdoors to mechanical and weather conditions that are very severe and that therefore require the mortar used for cementing the various elements of the insulator to have high mechanical strength in order to guarantee good cementing between the dielectric part and the metal element, regardless of the outdoor conditions.

To a first approximation, the mechanical strength of a cement mortar depends on the choice of the cement, be it aluminous cement or Portland cement, and on the mortar setting conditions, such as the temperature and the duration of setting. Once those parameters are determined, the mechanical strength depends to a large extent on the water-to-cement ratio in the mortar. Conventionally, the water used for mixing the mortar is added in excess in order to obtain good workability or consistency for the wet mortar mix. However, that quantity of water is actually greater than necessary for the process whereby the cement is hydrated, and thus, at the end of the process whereby the mortar sets and hardens, a fraction of the mixing water is not used by the hydration process and remains free in the mortar. On evaporating, that surplus quantity of water then gives rise to porosity in the mortar, and the final mechanical strength of the mortar is highly dependent on such porosity, i.e. greater porosity gives rise to lower strength. When manufacturing such an insulator, the cement mortar is allowed to solidify under predetermined temperature and humidity conditions that make it possible to obtain a strong cement mortar appropriate for the insulator.

In general, it is known that adding an additive of the plasticizer type makes it possible to improve the wetting power of the water, thereby enabling the water-to-cement ratio in the mortar to be reduced a little and thus enabling its mechanical strength to be increased slightly, but those improvements remain limited.

In addition, the distribution of the cement mortar in the dielectric part and/or in the metal elements of an insulator varies considerably as a function of the workability of the cement mortar. In order to guarantee a good distribution of the cement mortar, in particular, for example, without allowing air bubbles to appear on the surfaces of the elements or in the cement mortar, the insulator as assembled is generally subjected to vibration while performing the cementing method and before the mortar hardens. The magnitude and the duration of the vibration depend to a large extent on the workability of the cement mortar.

It is well known that a high-strength cement mortar has low workability, i.e. it is very viscous, or even dry, is difficult to put into place, and spreads little over the elements to be assembled together. It is therefore necessary, prior to hardening, for such high-strength and low-workability cement mortar to be subjected to vibration for about 40 seconds so that it is distributed homogeneously, i.e. so that it is put into place around the elements to be cemented.

The use of a cement mortar having higher workability could make it possible to limit use of such a vibration stage, but a highly workable cement mortar is conventionally associated with a large reduction in its mechanical strength, which is generally not appropriate for high-voltage electrical insulators.

Currently, it is therefore necessary to choose between a cement mortar that has high strength but that suffers from the drawback of having low workability, and a mortar that has high workability but low strength.

Attempts are known to have been made to overcome this contradiction. For example, Patent FR 2 943 169 discloses a method of preparing a cement mortar, in which method a glucose-containing aqueous solution based on a water-soluble dispersant containing carboxyl functions and polyether chains is added to the water, prior to mixing. The glucose-containing aqueous solution makes it possible to reduce the quantity of water added to the mortar, and thus to increase its mechanical strength. However, the cement mortar obtained by that method requires prolonged application of vibrations and the improvement in its mechanical strength is limited.

It can therefore be observed that designing a novel cement mortar that has the desired mechanical and consistency characteristics remains difficult.

SUMMARY OF THE INVENTION

An object of the invention is to propose a novel method of manufacturing a high-voltage electrical insulator using cement mortar that has very good workability combined with very good mechanical strength, while also being easy to implement.

To this end, the invention provides a method of manufacturing a high-voltage electrical insulator comprising at least one metal insulator element cemented to a dielectric insulator element by means of a cement mortar, in which method, at least one of the following steps is performed:

preparing said cement mortar from a dry mix comprising at least aluminous cement and sand, said dry mix being mixed with at least water;

assembling said dielectric insulator element with said metal insulator element, said cement mortar being placed between said dielectric insulator element and said metal insulator element; and vibrating said dielectric insulator element and said metal insulator element as assembled together, so as to distribute said cement mortar between said dielectric insulator element and said metal insulator element;

said method being characterized in that, in order to prepare said cement mortar, at least one active ingredient of the polymer superplasticizer type based on polyglycol methacrylic acid ester is added, and in that said vibrating is performed for a duration lying in the range 2 seconds to 20 seconds, and preferably in the range 4 seconds to 15 seconds.

Surprisingly, by using such a superplasticizer, a cement mortar is obtained that is thixotropic prior to hardening, i.e. it liquefies under stress or whenever it is stirred, and therefore it has very good workability. The cement mortar spreads sufficiently rapidly between the insulator elements to be cemented, and it has been found that vibrating for a duration lying in the range 2 seconds to 20 seconds, and preferably in the range 4 seconds to 15 seconds is sufficient to obtain an electrical insulator having the mechanical strength characteristics required for use on high-voltage and very high voltage lines. In addition, this shortened vibration duration contributes to considerably increasing the throughput rate at which the insulators are manufactured, in particular on automatic-conveyor production lines.

The method of the invention contributes to reducing the presence of cracks, of bubbles, or of other defects at the surface or in the cement mortar, and to reinforcing its mechanical strength.

In addition, the method makes it possible to reduce considerably the proportion of water added to the cement mortar and thus to increase the mechanical strength of the cement mortar after hardening by an amount lying in the range 20% to 25% relative to a conventional cement mortar.

The method of the invention for manufacturing a high-voltage electrical insulator may have the following features:

said vibrating is performed at a vibrating frequency lying in the range 300 hertz (Hz) to 450 Hz, and preferably in the range 380 Hz to 400 Hz;

said vibrating is performed using a pneumatic vibrator;

said vibrating is performed while the assembled-together dielectric elements and metal elements are moving along a conveyor;

during said preparation step, said active ingredient of the superplasticizer type is supplied in powder form and is incorporated into said dry mix;

during said preparation step, said active ingredient of the superplasticizer type is supplied in liquid form and is mixed with said water;

during said preparation step, said mix is formed so that, relative to the weight of said cement alone, the weight of sand lies in the range 15% to 45%, and preferably in the range 20% to 25%, the weight of said active ingredient of the superplasticizer type lies in the range 0.05% to 1%, and preferably in the range 0.1% to 0.5%, and the weight of water lies in the range 15% to 25%, preferably in the range 16% to 20%, and more preferably in the range 17% to 19%;

during said preparation step, said dry mix is mixed for a duration lying in the range 1 minute to 10 minutes, and preferably in the range 3 minutes to 5 minutes;

during said preparation step, said dry mix is mixed with said water for a duration lying in the range 1 minute to 10 minutes, and preferably in the range 3 minutes to 5 minutes;

after said vibration step, the method further comprises a hardening step performed in a bath of water and consisting in causing said cement mortar to harden in water at a temperature lying in the range 45° C. to 80° C., preferably in the range 50° C. to 75° C., and more preferably in the range 65° C. to 75° C.

Tests have shown that using vibration to distribute the cement mortar between the insulator elements to be cemented is optimum with a vibration frequency lying in the range 300 Hz to 450 Hz, and preferably in the range 380 Hz to 400 Hz.

The vibration may be performed on a stationary cementing platform with a pneumatic vibrator. But it has been observed that vibration can also be performed, at least in part, while the insulator elements as assembled together with the cement mortar are moving along a conveyor, it being possible for the conveyor to be chain conveyor that, in operation, transmits natural vibrations to the insulator elements being conveyed, which vibrations are sufficient to liquefy the thixotropic cement mortar. This contributes to increasing the rate of manufacturing of the electrical insulators.

The invention also provides a high-voltage insulator of the cap and pin type, manufactured using the method of the invention, in which insulator the dielectric insulator element defines a skirt made of glass or of porcelain, and the metal insulator element defines a metal cap or a metal pin, and the invention also provides a string of such electrical insulators for a high voltage or a very high voltage electricity line.

The invention also provides a substation high-voltage insulator manufactured using a method of the invention, in which insulator the dielectric insulator element defines a tubular body made of porcelain with fins or "sheds", and the metal insulator element defines a metal end fitting.

BRIEF DESCRIPTION OF THE DRAWING

The invention is described in more detail below with reference to the accompany drawing which shows a non-limiting example of the invention.

DESCRIPTION OF IMPLEMENTATIONS

Figure 1:
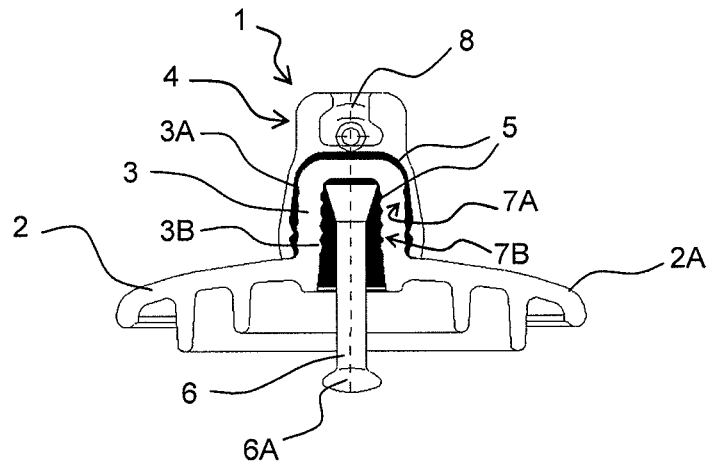
FIG. 1 diagrammatically shows a high-voltage electrical insulator of the cap and pin type of the invention.

FIG. 1 shows a high-voltage electrical insulator 1 of the cap and pin type that is manufactured using the method of the invention, and that comprises a dielectric insulator element defining a dielectric part 2, e.g. made of glass or of porcelain, defining a peripheral skirt 2A and a hollow head 3 with a ribbed outside surface 3A and an inside cavity 3B that is also ribbed, and a first metal insulator element defining a cap 4 and a second metal insulator element defining a pin 6, the cap 4 and the pin 6 being cemented to the dielectric part 2.

As can be seen in FIG. 1, the cap 4 is fitted over the head 3 and cemented to the outside surface 3A of the head 3 using a cement mortar 5, the pin 6 being cemented inside the cavity 3B of the dielectric part 2 using cement mortar 5 similar to the mortar present inside the cap 4. Advantageously, the respective ribs 7A, 7B of the outside surface 3A and of the inside cavity 3B of the head 3 enable the cement mortar 5 to adhere better to the dielectric part 2.

As can be seen in FIG. 1, the top of the cap 4 is provided with a recess 8 having a shape complementary to the shape of a free end 6A of the pin 6 so as to allow a pin 6 of one insulator 1 to be inserted into the recess 8 of a cap 4 of another insulator 1 in order to form a string of insulators 1 mounted in series (not shown).

Figure 2:
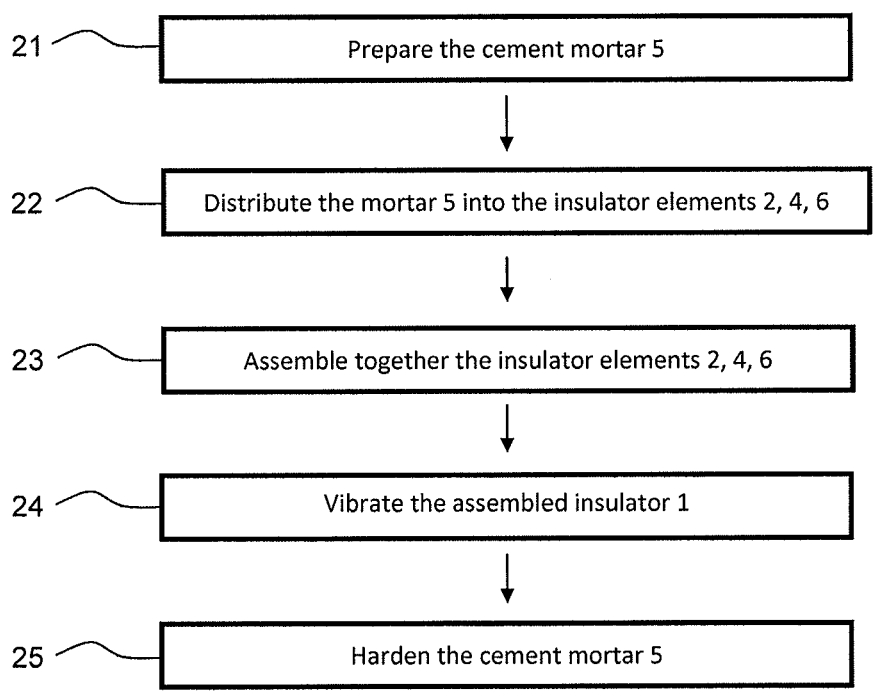
FIG. 2 is a flow chart of the method of the invention for manufacturing the FIG. 1 insulator.

The method of the invention for manufacturing an insulator 1 is described below with reference to FIG. 2.

The preparation step 21 starts with preparing the cement mortar 5 by manually dry-mixing aluminous cement, sand, and a plasticizer of the superplasticizer type in solid form, chosen from anionic polymers based on polyglycol methacrylic acid ester, e.g. in powder or in granular form, so as to obtain a dry mix.

Then the dry mix is mixed slowly in a preferably standardized mixer, e.g. complying with Standard NF EN 196-1, for a duration lying in the range 1 minute to 10 minutes, and preferably in the range 3 minutes to 5 minutes, in order to obtain a fully homogenous dry mix.

In this dry mix, the weight of sand lies in the range 15% to 45%, and preferably in the range 20% to 25%, relative to the weight of said dry cement alone, and the weight of superplasticizer lies in the range 0.05% to 1%, and preferably in the range 0.1% to 0.5%, relative to the weight of said dry cement alone. Thus, the proportion by weight of cement in the dry mix lies in the range 85% to 55%, and preferably in the range 75% to 80%.

Preferably, the cement is chosen from aluminous cements, which may also be referred to as "cast cements", containing an alumina content lying approximately in the range 30% to 75%. The sand is preferably fine sand of grain size that is controlled and that is centered on a value lying approximately in the range 200 micrometers to 300 micrometers.

Then, water is added to the fully homogeneous dry mix, preferably on a single occasion, so as to guarantee good wettability of the dry mix, the weight of water lying in the range 15% to 25%, preferably in the range 16% to 20%, and more preferably in the range 17% to 19%, relative to the weight of dry cement alone. The proportion of water may be adjusted within these ranges depending on the degree of workability required for the cement mortar 5.

The dry mix is then mixed slowly with the water until the dry mix is fully wetted, and then the wetted mix is mixed vigorously for a duration lying in the range 1 minute to 10 minutes, and preferably in the range 3 minutes to 5 minutes, so as to obtain, at the outlet of the mixer, a cement mortar paste 5 that is wet and thixotropic, i.e. capable of liquefying whenever it is stirred, thereby imparting very good workability to the cement mortar 5 and making it considerably easier to use.

Mixing "slowly" and "vigorously" means mixing as defined in Table 2 of Standard NF EN 196-1.

By way of a variant, it is possible to use a plasticizer of the superplasticizer type in liquid form, in the proportions as described above. In which case, the liquid superplasticizer is firstly mixed with water, and then the mix made up of the water and of the superplasticizer is added to the homogeneous dry mix made up only of the cement and of the sand, and the dry mix and the wet mix are then mixed respectively as described above. More precisely, the aluminous cement and the sand are firstly dry-mixed manually, and then the dry mix is mixed slowly in a preferably standardized mixer for a duration lying in the range 1 minute to 10 minutes, and preferably in the range 3 minutes to 5 minutes, in order to obtain a fully homogenous dry mix. Then water that is premixed with the plasticizer of the superplasticizer type that is described above but that is in liquid form, chosen from anionic polymers based on polyglycol methacrylic acid ester, is added to the fully homogenous dry mix, preferably on a single occasion in order to ensure that the dry mix has good wettability. The dry mix is then mixed slowly with the water and the superplasticizer until the dry mix is fully wetted, and then the wetted mix is mixed vigorously for a duration lying in the range 1 minute to 10 minutes, and preferably in the range 3 minutes to 5 minutes, so as to obtain, at the outlet of the mixer, a cement mortar paste 5 that is wet and thixotropic, as described above.

Then, in the distribution step 22, the cement mortar 5 is distributed both inside the cap 4 and also inside the inside cavity 3B of the head 3 of the dielectric part 2, which is facilitated by the very good workability of the cement mortar 5.

The insulator 1 is then assembled in the assembly step 23 by placing the pin 6 in the inside cavity 3B of the head 3 of the dielectric part 2 in a first stage, and by placing the head 3 of the dielectric part 2 in the cap 4 in a second stage. More precisely, the pin 6 is brought into the mortar 5 of the inside cavity 3B until the pin 6 comes into abutment against the end-wall of the inside cavity 3B.

Then, in the vibration step 24, the insulator 1 is subjected to short vibrations for a duration lying in the range 2 seconds to 20 seconds, and preferably in the range 4 seconds to 15 seconds. These short vibrations enable the thixotropic cement mortar 5 to be made more fluid and help to put it into place or to distribute it homogeneously inside the cap 4 and inside the inside cavity 3B, while, in particular, reducing the formation of air bubbles or defects in the cement mortar 5.

Finally, in the hardening step 25, the cement mortar 5 is hardened in a "climate-controlled curing" tank by immersing the insulator 1 in a bath of water, preferably hot water at a temperature lying in the range 45° C. to 80° C., preferably in the range 50° C. to 75° C., and more preferably in the range 65° C. to 75° C., for a duration lying in the range 40 minutes to 120 minutes. The cement mortar 5 is hardened by the climate-controlled curing, and is then left to cool in air at ambient temperature.

Naturally, it is possible to reverse the order of the assembly step 23 for assembling the insulator 1, i.e. so that, in a first stage, the dielectric part 2 is placed in the cap 4, and then, in a second stage, the pin 6 is placed in the dielectric part 2 before the cement mortar 5 is hardened.

By way of a variant, after the cement mortar 5 is distributed in the insulator elements, it is also possible, in a first stage, to assemble the pin 6 in the inside cavity 3B of the head 3 of the dielectric part 2, and then to harden the cement mortar 5 as described above for this portion of the insulator 1 only, i.e. the portion made up of the dielectric part 2 and of the pin 6. Then, in a second stage, the head 3 of the dielectric part 2 is assembled in the cap 4, and the cement mortar 5 is hardened as described above for the fully assembled insulator 1.

It is also possible to reverse the order of assembly of the insulator 1 of this variant by starting by assembling the dielectric part 2 in the cap 4 and by hardening the cement mortar 5 of this insulator portion 1 made up of the dielectric part 2 and of the cap 4; and then by assembling the pin 6 in the dielectric part 2 and hardening the cement mortar 5 of this other insulator portion 1.

Advantageously, use of a cement mortar of the invention makes it possible to manufacture a high-voltage electrical insulator 1 in a more compact cementing workshop, with an improved throughput rate. In addition, the forces or stresses applied to the high-voltage electrical insulator 1 are better distributed over the dielectric part 2, thereby further increasing the mechanical strength of the insulator 1. It is thus possible, for a given mechanical range of high-voltage electrical insulator, to obtain high-voltage electrical insulators of dimensions that are small compared with the dimensions of present-day insulators.

Naturally, the present invention is in no way limited to the above description of one of its implementations, which can undergo modifications without going beyond the ambit of the invention.

In particular, it is also possible, using the manufacturing method of the invention, to manufacture a high voltage or very high voltage substation insulator, provided with metal end fittings for anchoring to the ground or for supporting switchgear cemented to a dielectric body made of porcelain or of glass in the form of a preferably cylindrical tubular column provided with fins or "sheds".

The invention claimed is:

1. A method of manufacturing a high-voltage electrical insulator comprising at least one metal insulator element cemented to a dielectric insulator element by a cement mortar, in which method, at least one of the following steps is performed:
   preparing said cement mortar from a dry mix comprising at least aluminous cement and sand, said dry mix being mixed with at least water;
   assembling said dielectric insulator element with said metal insulator element, said cement mortar being placed between said dielectric insulator element and said metal insulator element; and
   vibrating said dielectric insulator element and said metal insulator element as assembled together, so as to distribute said cement mortar between said dielectric insulator element and said metal insulator element;
   said method being characterized in that, in order to prepare said cement mortar, at least one active ingredient of the polymer superplasticizer type based on polyglycol methacrylic acid ester is added, and in that said vibrating is performed for a duration lying in the range 2 seconds to 20 seconds, and preferably in the range 4 seconds to 15 seconds.

2. A method of manufacturing a high-voltage electrical insulator according to claim 1, wherein said vibrating is performed at a vibrating frequency lying in the range 300 hertz to 450 hertz, and preferably in the range 380 hertz to 400 hertz.

3. A method of manufacturing a high-voltage electrical insulator according to claim 1, wherein said vibrating is performed using a pneumatic vibrator.

4. A method of manufacturing a high-voltage electrical insulator according to claim 1, wherein said vibrating is performed while the dielectric insulator element and metal insulator element are assembled together and moving along a conveyor.

5. A method of manufacturing a high-voltage electrical insulator according to claim 1, wherein, during said at least one of the steps, said active ingredient of the superplasticizer type is supplied in powder form and is incorporated into said dry mix.

6. A method of manufacturing a high-voltage electrical insulator according to claim 1, wherein, during said at least one of the steps, said active ingredient of the superplasticizer type is supplied in liquid form and is mixed with said water.

7. A method of manufacturing a high-voltage electrical insulator according to claim 1, wherein, during said at least one of the steps, said mix is formed so that, relative to the weight of said cement alone, the weight of sand lies in the range 15 percent to 45 percent, and preferably in the range 20 percent to 25 percent, the weight of said active ingredient of the superplasticizer type lies in the range 0.05 percent to 1 percent, and preferably in the range 0.1 percent to 0.5 percent, and the weight of water lies in the range 15 percent to 25 percent, preferably in the range 16 percent to 20 percent, and more preferably in the range 17 percent to 19 percent.

8. A method of manufacturing a high-voltage electrical insulator according to claim 1, wherein, during said at least one of the steps, said dry mix is mixed for a duration lying in the range 1 minute to 10 minutes, and preferably in the range 3 minutes to 5 minutes.

9. A method of manufacturing a high-voltage insulator according to claim 1, wherein during said at least one of the steps, said dry mix is mixed with said water for a duration lying in the range 1 minute to 10 minutes, and preferably in the range 3 minutes to 5 minutes.

10. A method of manufacturing a high-voltage electrical insulator according to claim 1, wherein, after said vibration step, it further comprises a hardening step performed in a bath of water and consisting in causing said cement mortar to harden in said water at a temperature lying in the range 45° C. to 80° C., preferably in the range 50° C. to 75° C., and more preferably in the range 65° C. to 75° C.

11. A high-voltage insulator of the cap and pin type, manufactured using a method according to claim 1, wherein insulator the dielectric insulator element defines a skirt made of glass or of porcelain, and the metal insulator element defines a metal cap or a metal pin.

12. A string of electrical insulators for a high voltage or a very high voltage electricity line, said string comprising a plurality of electrical insulators according to claim 11.

13. A substation high-voltage insulator manufactured using a method according to claim 1, wherein insulator the dielectric insulator element defines a tubular body made of porcelain with fins or "sheds", and the metal insulator element defines a metal end fitting.

* * * * *